E. M. COLE.
SEED MECHANISM FOR PLANTERS.
APPLICATION FILED FEB. 7, 1917.
1,325,142.
Patented Dec. 16, 1919.
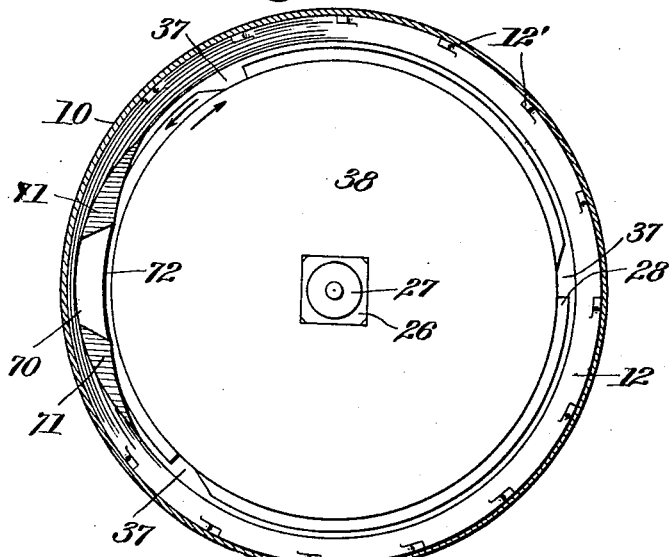
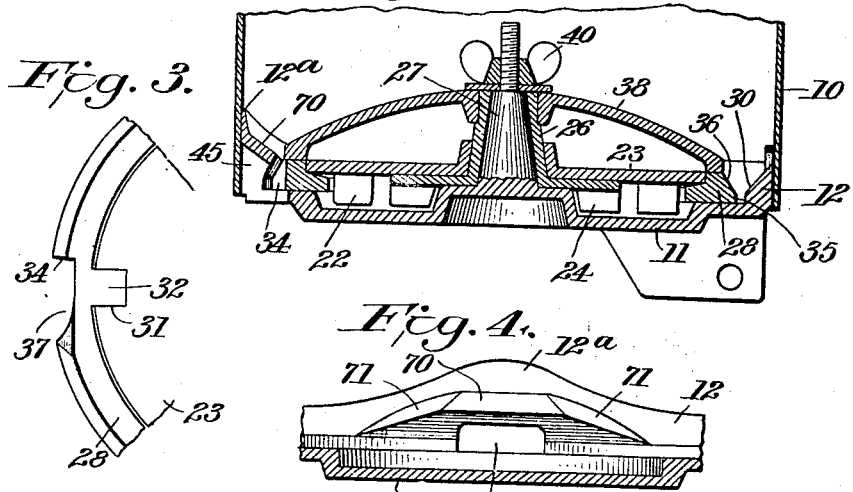
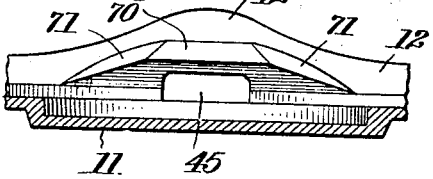
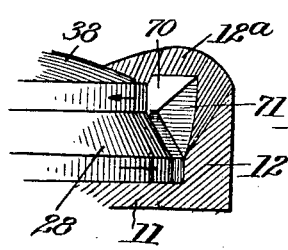
Inventor,
E. M. Cole.
By H. L. Davis
Attorney

UNITED STATES PATENT OFFICE.

EUGENE MACON COLE, OF CHARLOTTE, NORTH CAROLINA.

SEED MECHANISM FOR PLANTERS.

1,325,142.  Specification of Letters Patent.  Patented Dec. 16, 1919.

Application filed February 7, 1917. Serial No. 147,154.

*To all whom it may concern:*

Be it known that I, EUGENE M. COLE, a citizen of the United States, residing at Charlotte, in the county of Mecklenburg and State of North Carolina, have invented certain new and useful Improvements in Seed Mechanism for Planters, of which the following is a specification.

This invention relates to seeders and planters of the type shown in my co-pending application, Serial No. 147,153.

The object of the present invention is to provide an improved wiper device differing slightly in construction from that shown and claimed in said co-pending application.

In order that the invention may be readily understood, reference is had to the accompanying drawing, forming a part of this specification, and in which, Figure 1 is a plan view of the seed hopper and associated parts;

Fig. 2 is a vertical section through the same;

Fig. 3 is a fragmentary plan showing the means for driving the seed ring;

Fig. 4 is a front elevation of my improved wiper device; and,

Fig. 5 is an end elevation thereof, showing its relation to the seed ring, part of the hopper being shown in section.

Referring to the drawings, the planter as a whole is similar to that shown in the application above referred to, and comprises a hopper 10, having a bottom plate 11. This plate is provided with an upstanding peripheral flange 12, preferably provided with upwardly projecting teeth 12'. The inner surface of such flange is inclined outwardly, as indicated at 30 in Fig. 2.

The bottom plate 11 has formed on the upper side thereof a runway in which rotates the seed ring 28. The edge of this seed ring has its lower part vertical, as indicated at 35, and its upper part 36 beveled or inclined inwardly, the inclined surfaces 30 and 36 forming a V-shaped seed receiving trough. The plain flat seed ring 28 is provided with a suitable number of teeth 34, forming pockets 37, for the reception of the seed to be dropped, such pockets being in the nature of simple notches cut in the edge of the seed ring. The seed in such pockets rest upon the runway, which, in fact, constitutes the bottom of the pockets. The plate 11, forming the bottom of the hopper, is provided at one side, adjacent the seed ring runway, with a discharge opening 45, through which the seed are delivered from the pockets. It will be noted that, owing to the beveled upper edge of the seed ring, the pockets are wider at the bottom than at the top, and become very shallow at the periphery of the ring. By virtue of this construction, a large seed can be accommodated at the bottom of the pocket but even a single small seed will cover the whole of the upper part of the rear wall of the pocket, thereby making it impossible for such rear wall to engage adjacent surplus seed, and the depth of the pocket at its outer edge is only sufficient to accommodate a single seed.

A driving member 26 has a hub journaled on a boss 27, secured to the bottom plate 11, and a circular dome-shaped cap 38 has a square opening at its center which fits over the similar end of the member 26. The parts are held in assembled relation by means of a nut 40.

The seed ring 28 is driven by a driving member or plate 23, which is journaled on the member 26. The members 23 and 26 have annular series of teeth 22 and 24, respectively, projecting from their lower faces, which teeth are adapted to engage with suitable driving gears (not shown), as in my co-pending application. The driving member 23 has one or more notches 31 in its edge which engage with lugs 32, secured to the seed ring 28, as shown in Fig. 3, the notch and lug constituting a driving connection.

It will be understood that the seed from the hopper fill the seed trough and are carried around the runway by the pockets 37. In order to prevent an undue number of seed being delivered to the opening 45, it is necessary to remove the surplus seed from the pockets before such pockets reach the discharge opening 45. To this end, I provide the improved wiper device forming the subject of the present application.

The flange 12 is preferably extended to form an upwardly projecting portion 12ª, adjacent the discharge opening 45, and on the inside of this flange is secured a rigid lug, preferably formed integral with the flange. This lug comprises a body portion 70 and inclined tapering ends 71, extending downwardly along the inclined wall 30 of the flange 12 into the seed trough, as clearly shown in Figs. 4 and 5. The edge of this lug overhangs the teeth 34 of the seed ring, as shown in Fig. 2, and has a curved inner surface 72, conforming with the shape of the edge of the cap 38.

It will be understood that as in my other application, the seed ring and cap are driven in opposite directions, as indicated by the arrows in Fig. 1. As the seed pockets travel toward the lug or wiper, the surplus seed strike against the lower edge or point of the inclined surface 71, and are forced upwardly along such surface, being thus elevated above and carried past the discharge opening 45.

It will be observed that my improved wiper contains no movable or spring pressed parts, but that it is rigidly secured to and preferably integral with the flange 12 of the bottom plate 11. This results in an exceedingly rugged and strong construction, the simplicity and lasting qualities of which are as noteworthy as its efficiency in operation.

What I claim is:

1. In a planter, a hopper having a bottom formed with a runway, a seed ring rotatably mounted in said runway, and having notches in its edge forming seed pockets, the surface of the runway itself constituting the bottom of said pockets, said hopper bottom having a discharge opening adjacent the runway, an outwardly inclined wall surrounding said runway, the upper portion of the edge of the ring being inwardly beveled and forming with said outwardly inclined wall a seed receiving trough, the extreme outer portions of said pockets being relatively shallow, by virtue of said beveled edges, and a wiper disposed above said discharge opening and overhanging the beveled edge of said seed ring, said wiper comprising a rigid lug fixed to said outwardly inclined wall, and having a tapering inclined end extending down along the same, into said seed trough above the pockets in said ring.

2. In a planter, a hopper having a bottom formed with a runway, a seed ring rotatably mounted in said runway and having seed pockets at its periphery, said bottom having a discharge opening adjacent the runway, an outwardly inclined wall surrounding said runway, said ring having an inwardly beveled edge forming with said inclined wall a seed receiving trough, a rotary, circular cap mounted concentrically of and superposed upon said seed ring, the edge of such cap overlying said pockets, and a wiper disposed above said discharge opening and overhanging the beveled edge of said seed ring, said wiper comprising a fixed lug having a body portion curved to embrace the edge of said cap, and provided with a tapering inclined end extending down along said inclined wall into said seed trough.

In testimony whereof I have affixed my signature.

EUGENE MACON COLE.